United States Patent
Kinzie et al.

(10) Patent No.: US 7,854,595 B2
(45) Date of Patent: Dec. 21, 2010

(54) WIND TURBINE BLADE TIP SHAPES

(75) Inventors: Kevin W. Kinzie, Moore, SC (US);
Kevin J. Standish, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 280 days.

(21) Appl. No.: 12/182,184

(22) Filed: Jul. 30, 2008

(65) Prior Publication Data
US 2010/0028157 A1   Feb. 4, 2010

(51) Int. Cl.
*F03D 1/06* (2006.01)

(52) U.S. Cl. .................. 416/228; 416/223 R; 416/237; 416/DIG. 2; 416/DIG. 5

(58) Field of Classification Search ............. 416/223 R, 416/223 A, 224, 228, 235, 237, 243, DIG. 2, 416/DIG. 5; 415/191, 208.1, 208.2, 211.2
See application file for complete search history.

(56) References Cited

U.S. PATENT DOCUMENTS

| | | | | |
|---|---|---|---|---|
| 2,962,260 A | * | 11/1960 | Foley | 416/189 |
| 4,334,828 A | * | 6/1982 | Moffitt | 416/228 |
| 4,451,206 A | * | 5/1984 | Philippe et al. | 416/228 |
| 4,880,355 A | * | 11/1989 | Vuillet et al. | 416/228 |
| 6,000,911 A | * | 12/1999 | Toulmay et al. | 416/223 R |
| 2009/0297354 A1 | * | 12/2009 | Herr et al. | 416/223 R |
| 2009/0297355 A1 | * | 12/2009 | Herr et al. | 416/223 R |

* cited by examiner

*Primary Examiner*—Christopher Verdier
(74) *Attorney, Agent, or Firm*—William F. Heinze; Ernest G. Cusick; Frank A. Landgraff

(57) ABSTRACT

A blade for a wind turbine includes a chord of length "c" positioned with a leading edge tip chord angle and trailing edge tip chord angle of between approximately 45 and 75 degrees; a tip having a shear web plane radii distribution in the ranges of

| L/c (%) | R/c (%) |
|---|---|
| 0-10% | 1.03-3.68% |
| 30-40% | 2.91-5.79% |
| 60-70% | 1.77-2.5% |
| 90-100% | 0.229-.350% | where "L/c" is a range of an approximate normalized location along the chord line expressed as a percentage of the chord length from a leading edge of the blade; and where "R/c" is a range of an approximate normalized shear web plane tip radius expressed as a percentage of the chord length, for each normalized location L/c.

20 Claims, 4 Drawing Sheets

US 7,854,595 B2

WIND TURBINE BLADE TIP SHAPES

BACKGROUND OF THE INVENTION

1. Technical Field

The subject matter described here generally relates to fluid reaction surfaces with specific blade structures and, more particularly, to wind turbines blades tip shapes.

2. Related Art

A wind turbine is a machine for converting the kinetic energy in wind into mechanical energy. If the mechanical energy is used directly by the machinery, such as to pump water or to grind wheat, then the wind turbine may be referred to as a windmill. Similarly, if the mechanical energy is converted to electricity, then the machine may also be referred to as a wind generator or wind power plant.

Wind turbines are typically categorized according to the vertical or horizontal axis about which the blades rotate. One so-called horizontal-axis wind generator is schematically illustrated in FIG. 1 and available from General Electric Company. This particular configuration for a wind turbine 2 includes a tower 4 supporting a nacelle 6 enclosing a drive train 8. The blades 10 are arranged on a hub to form a "rotor" at one end of the drive train 8 outside of the nacelle 6. The rotating blades 10 drive a gearbox 12 connected to an electrical generator 14 at the other end of the drive train 8 arranged inside the nacelle 6 along with a control system 16 that receives input from an anemometer 18.

The blades 10 generate lift and capture momentum from moving air that is then imparted to a rotor as the blades spin in the "rotor plane." Each blade is typically secured at its "root" end, and then "spans" radially "outboard" to a free, "tip" end. The distance from the tip to the root, at the opposite end of the blade, is called the "span." The front, or "leading edge," of the blade connects the forward-most points of the blade that first contact the air. The rear, or "trailing edge," of the blade is where airflow that has been separated by the leading edge rejoins after passing over the suction and pressure surfaces of the blade.

A "chord line" connects the leading and trailing edges of a cross section of the blade 10 that is oriented normal to the radial direction. The length of the chord line is simply referred to as the "chord." Since many blades 10 change their chord over the span, the chord length is referred to as the "root chord," near the root, and the "tip chord," near the tip of the blade. The chord lines are arranged in the "chord planes" that extend through the corresponding pressure and suction surfaces of the blade. The center of the chord plane, or "chord plane center line," is formed by a line on the chord plane which is halfway between the leading and trailing edge of the blade 10. Multiple "shear web planes" are arranged perpendicular to the chord plane.

The resulting shape of the blade 10, when viewed perpendicular to the direction of flow, is called the "planform." For example, FIG. 2 is schematic planform view of the tip portion of the blade 10 shown in FIG. 1 where the tip chord 20 forms a "leading edge tip chord angle" α with the leading edge 22, and a "trailing edge tip chord angle" β with the trailing edge 24.

The noise and power performance of the wind turbine blades 10 depends, in part, upon vortex development at the tip of the blade. Various techniques have been proposed to control this vortex development. For example, commonly-owned co-pending U.S. application Ser. No. 11/827,532 filed on Jul. 12, 2007 discloses a wind turbine blade having a vortex breaking system for reducing noise while commonly-owned co-pending U.S. Application Serial No. 12129997 filed on May 30, 2008 discloses wind turbine blade planforms with twisted and tapered tips. While vortex development can generally be reduced by minimizing the aerodynamic load at the tip of the blade, so-called "tip unloading" typically causes a significant reduction in power that is produced by the blade.

BRIEF DESCRIPTION OF THE INVENTION

These and other drawbacks associated with such conventional approaches are addressed here in by providing, in various embodiments, a blade for a wind turbine including a chord of length "c" positioned with a leading edge tip chord angle and trailing edge tip chord angle of between approximately 45 and 75 degrees; a tip having a shear web plane radii distribution in the ranges of

| L/c (%) | R/c (%) |
|---|---|
| 0-10% | 1.03-3.68% |
| 30-40% | 2.91-5.79% |
| 60-70% | 1.77-2.5% |
| 90-100% | 0.229-.350% | where "L/c" is a range of an approximate normalized location along the chord line expressed as a percentage of the chord length from a leading edge of the blade; and where "R/c" is a range of an approximate normalized shear web plane tip radius, expressed as a percentage of the chord length, for each normalized location L/c.

BRIEF DESCRIPTION OF THE DRAWINGS

Various aspects of this technology will now be described with reference to the following figures ("FIGs.") which are not necessarily drawn to scale, but use the same reference numerals to designate corresponding parts throughout each of the several views.

DETAILED DESCRIPTION OF THE INVENTION

Figure 1:
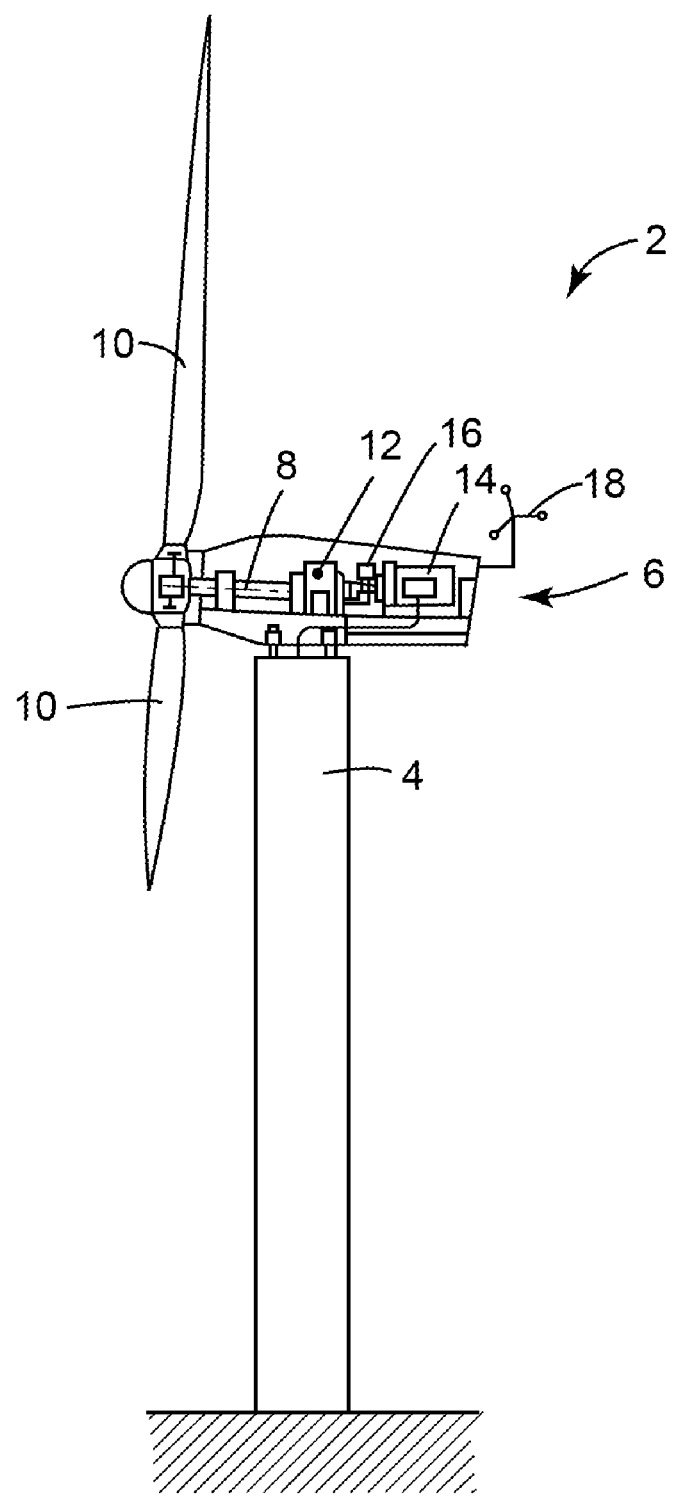
FIG. 1 is a schematic side view of a conventional wind generator.
Figure 2:
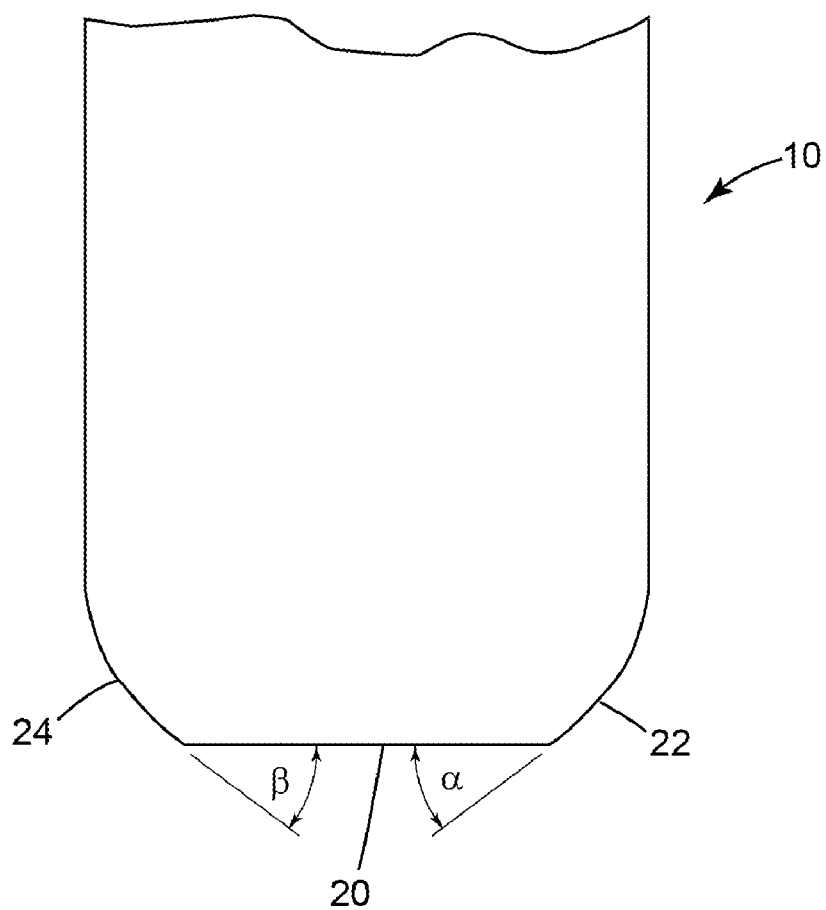
FIG. 2 is a schematic planform view of a tip portion of the conventional blade shown in FIG. 1
Figure 3:
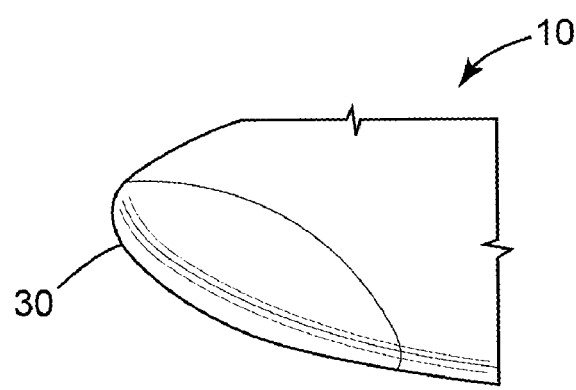
FIG. 3 is an orthographic view of a cap secured to the tip of the blade shown in FIGS. 1 and 2.

FIG. 3 is an orthographic view of a cap 30 that is secured to the tip of the blade 10 shown in FIGS. 1 and 2. However, the cap 30 may also be configured to fit with the tips of other wind turbine blades. For example, the cap 30 may be provided with a bolt or mounting bracket that is secured to a drain hole of the blade. In addition, some or all of the cap 30 may be configured as an integral part of any wind turbine blade. The cap 30 may sometimes be referred to as a "side edge cap."

Figure 4:
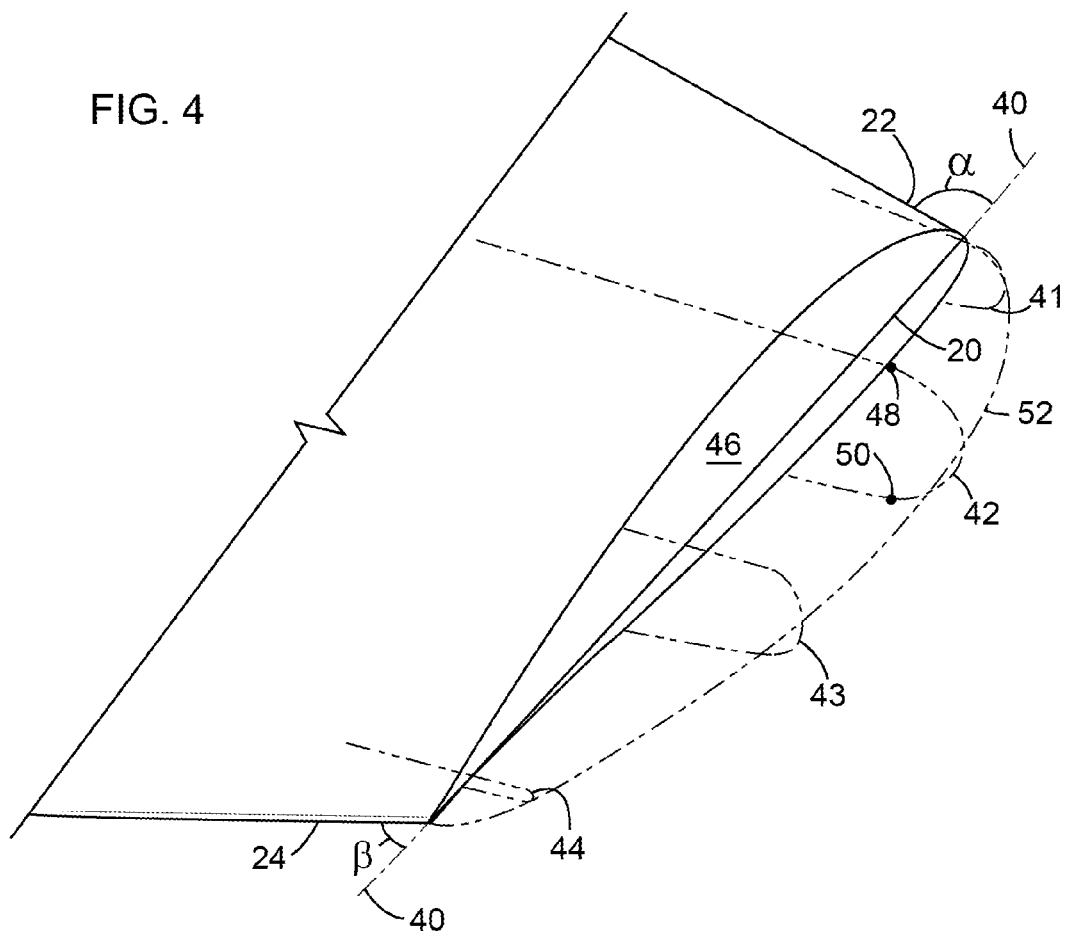
FIG. 4 is a schematic orthographic view of a profile for shaping the cap shown in FIG. 3.

FIG. 4 is a schematic, orthographic view of a profile for the tip of a wind turbine blade such as the cap shown in FIG. 3. In FIG. 4, the leading edge tip chord angle α and the trailing edge tip chord angle β are illustrated as in FIG. 2 with respect to the chord plane center line 40. For example, the leading edge tip chord angle α and trailing edge tip chord angle β may be substantially the same magnitude, in a range of between about 75 degrees and 45 degrees, or a smaller range of between about 50 degrees and 70 degrees, or an even smaller range of between about 65 degrees and approximately 55 degrees. Alternatively the leading edge tip chord angle α and trailing edge tip chord angle β may have different magnitudes within these ranges, or at least one or both may be about 60 degrees. If an existing blade 10 does not have a tip chord 20 with the appropriate angles, then the blade can be shortened ("under built") or lengthened ("over built") in order to obtain a tip chord having the appropriate leading edge tip chord angle α and trailing edge tip chord angle β.

In the tip profile of FIG. 4, the outer edge of the tip is provided with multiple curvatures in various shear web planes. In this example, the first shear web plane curvature 41 is arranged at about 0% to 10% of the chord from the leading edge; the second shear web plane curvature 42 is arranged at about 30% to 40% of the chord from the leading edge; the third shear web plane curvature 43 is arranged at about 60% to 70% of the chord from the leading edge; and the fourth shear web plane curvature 44 is arranged at about 90% to 100% of the chord from the leading edge. However, any other number of curvatures may also be arranged at these and/or other locations along the chord plane 46.

In the example illustrated here, the chord line 20 is positioned with a leading edge tip chord angle α and trailing edge tip chord angle β in a wide range of between approximately 45 and 75 degrees, a narrower range of approximately 50 and 70, and an even narrower range of between 55 and 65 degrees. The curvatures 41-44 are semicircular with the following shear web plane radii distribution defining a range of radius values for "R" in millimeters at each location:

| Location | L/c (%) | R (mm) | R/c (%) |
|---|---|---|---|
| 41 | 0-10% | 3.6-7 mm | 1.03-3.68% |
| 42 | 30-40% | 10-11 mm | 2.91-5.79% |
| 43 | 60-70% | 3.6-6.2 mm | 1.77-2.5% |
| 44 | 90-100% | 0.5-0.8 mm | 0.229-.350% |

Various shear web plane radii distributions may fall within these ranges, including

| L/c (%) | R/c (%) |
|---|---|
| 0-10% | 0.927-1.13% |
| 30-40% | 2.62-3.20% |
| 60-70% | 1.59-1.95% |
| 90-100% | 0.206-.252% |

For example, the following table lists typical values for R and R/c in millimeters at specific locations for three different approximate chord lengths in millimeters where the leading edge tip chord angle α and trailing edge tip chord angle β are both 60 degrees:

The chord length may be approximately 350 mm. However, the ratios listed above may be used with other chord lengths and/or at other distances along the chord 20 from the leading edge 22 of the blade. It is also expected that suitable results may be achieved by varying the above values for "R" and/or "R/c" over a range of values between plus or minus approximately ten percent, a narrower range of between plus or minus approximately five percent, and an even narrower range of between approximately one percent. In addition to such semi-circular curvature configurations, other curvature configurations may also be used, including, but not limited to any portion or combination of various types of algebraic curves, caustic curves, cissoids, conchoids, conic sections, elliptic curves, parabolic curves, hyperbolic curves, general plane curves, implicit curves, inverse curves, involutes and evolutes, pedal curves, polar curves, pursuit curves, radial curves, roulettes, strophoids, rational, transcendental, fractal, continuous, discontinuous, and/or piecewise curves.

Once the curvatures 41 through 44 are positioned, the (top) suction and (bottom) pressure surfaces are extended or projected spanwise to points that are tangential to the curvatures 41 through 44. For example, with regard to the second shear web plane curvature, FIG. 4 illustrates the suction surface projected spanwise to tangent point 48 and the pressure surface projected to tangent point 50. The outermost portions of the curvatures 41 through 44 are then connected with a spline 52, such as a B-spline, that completes a frame for the surface. The remaining surfaces of the tip are then smoothly laid over that frame.

Figure 5:
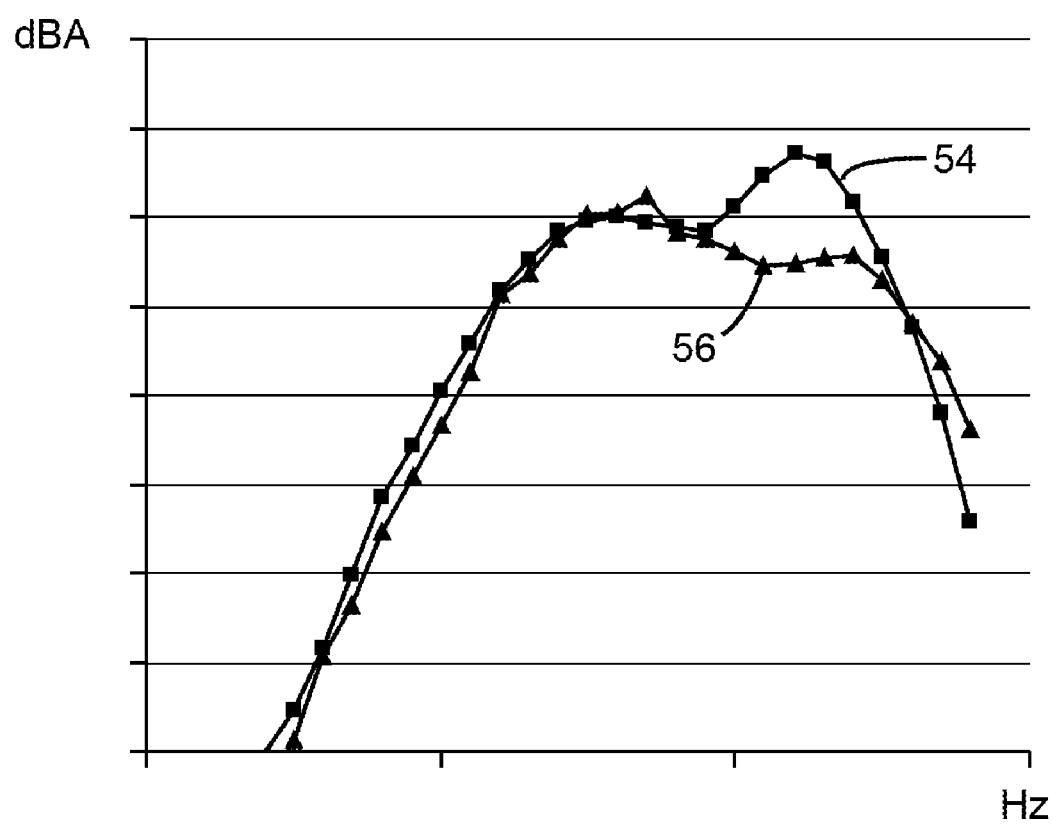
FIG. 5 is a noise spectra plot.

FIG. 5 is a noise spectra model plot showing sound pressure level in dBA on the vertical axis versus frequency in Hz on the horizontal axis for the blade 10 illustrated in FIG. 3 with a 350 mm chord length in the table above where the leading edge tip chord angle α1 and trailing edge tip chord angle β are approximately 60 degrees. Plot line 54 corresponds to the blade without the cap 30 while plot line 56 corresponds to the blade 10 with the cap. A notable reduction in sound pressure level occurs at mid-range frequencies when the cap 30 is used. It is expected that additional reductions in noise level will be available when the tip is formed from a porous material such as disclosed in commonly-owned co-pending U.S. application Ser. No. 11/798,377 which is incorporated by reference here.

It should be emphasized that the embodiments described above, and particularly any "preferred" embodiments, are merely examples of various implementations that have been set forth here to provide a clear understanding of various aspects of this technology. One of ordinary skill will be able to alter many of these embodiments without substantially departing from scope of protection defined solely by the proper construction of the following claims.

| Location | L/c (%) | R (mm) | R/c (%) | R (mm) | R/c (%) | R (mm) | R/c (%) |
|---|---|---|---|---|---|---|---|
| 41 | 5% | 7 mm | 3.68% | 4 mm | 2.00% | 3.6 mm | 1.03% |
| 42 | 35% | 11 mm | 5.79% | 10 mm | 5.00% | 10.2 mm | 2.91% |
| 43 | 65% | 3.5 mm | 1.84% | 5 mm | 2.50% | 6.2 mm | 1.77% |
| 44 | 95% | 0.5 mm | .263% | 0.7 mm | 0.350% | 0.8 mm | 0.229% |
| | Chord | 190 mm | | 200 mm | | 350 mm | |

What is claimed is:

1. A blade for a wind turbine, comprising
a chord of length "c" positioned with a leading edge tip chord angle and trailing edge tip chord angle of between approximately 45 and 75 degrees;
a tip having a shear web plane radii distribution in the ranges of

| L/c (%) | R/c (%) |
| --- | --- |
| 0-10% | 1.03-3.68% |
| 30-40% | 2.91-5.79% |
| 60-70% | 1.77-2.5% |
| 90-100% | 0.229-.350% | wherein "L/c" is a range of an approximate normalized location along the chord length expressed as a percentage of the chord length from a leading edge of the blade; and
wherein "R/c" is a range of an approximate normalized shear web plane tip radius, expressed as a percentage of the chord line length, for each normalized location L/c.

2. The blade recited in claim 1, wherein the leading edge tip chord angle and trailing edge tip chord angle are between approximately 50 and 70 degrees.

3. The blade recited in claim 2, wherein the leading edge tip chord angle and trailing edge tip chord angle are between approximately 55 and 65 degrees.

4. The blade recited in claim 3, wherein at least one of the leading edge tip chord angle and trailing edge tip chord angle is approximately 60 degrees.

5. The blade recited in claim 1, wherein an outermost edge of the tip comprises a B-spline.

6. The blade recited in claim 2, wherein an outermost edge of the tip comprises a B-spline.

7. The blade recited in claim 3, wherein an outermost edge of the tip comprises a B-spline.

8. The blade recited in claim 4, wherein an outermost edge of the tip comprises a B-spline.

9. A blade for a wind turbine, comprising
a chord of length "c" positioned with a leading edge tip chord angle and trailing edge tip chord angle of between approximately 55 and 65 degrees;
a tip having a shear web plane radii distribution in the ranges of

| L/c (%) | R/c (%) |
| --- | --- |
| 0-10% | 0.927-1.13% |
| 30-40% | 2.62-3.20% | wherein "L/c" is a range of an approximate normalized location along the chord length expressed as a percentage of the chord length from a leading edge of the blade; and
wherein "R/c" is a range of an approximate normalized shear web plane tip radius, expressed as a percentage of the chord line length, for each normalized location L/c.

10. The blade recited in claim 9, wherein the shear web plane radii distribution further comprises the ranges of

| L/c (%) | R/c (%) |
| --- | --- |
| 60-70% | 1.59-1.95% |
| 90-100% | 0.206-.252%. |

11. The blade recited in claim 10, wherein the shear web plane radii distribution further comprises approximately

| L/c (%) | R/c (%) |
| --- | --- |
| 0-10% | 1.03% |
| 30-40% | 2.91% |
| 60-70% | 1.77% |
| 90-100% | 0.229%. |

12. The blade recited in claim 9, wherein the chord length is approximately 350 mm.

13. The blade recited in claim 10, wherein the chord length is approximately 350 mm.

14. The blade recited in claim 11, wherein the chord length is approximately 350 mm.

15. The blade recited in claim 9, wherein at least one of the leading edge tip chord angle and trailing edge tip chord angle is approximately 60 degrees.

16. The blade recited in claim 10, wherein at least one of the leading edge tip chord angle and trailing edge tip chord angle is approximately 60 degrees.

17. The blade recited in claim 11, wherein at least one of the leading edge tip chord angle and trailing edge tip chord angle is approximately 60 degrees.

18. The blade recited in claim 14, wherein at least one of the leading edge tip chord angle and trailing edge tip chord angles is approximately 60 degrees.

19. The blade recited in claim 17, wherein each of the leading edge tip chord angle and trailing edge tip chord angles are approximately 60 degrees.

20. The blade recited in claim 18, wherein each of the leading edge tip chord angle and trailing edge tip chord angle are approximately 60 degrees.

* * * * *